(12) United States Patent
Dinh et al.

(10) Patent No.: US 7,485,804 B2
(45) Date of Patent: Feb. 3, 2009

(54) MULTI-MEDIA RECESS DATA LOW VOLTAGE BOX WITH SLIDE-AWAY HIDDEN COVER

(75) Inventors: Cong Thanh Dinh, Collierville, TN (US); Robert Kevin Jolly, Cordova, TN (US)

(73) Assignee: Thomas & Betts International, Inc., Wilmington, DE (US)

( * ) Notice: Subject to any disclaimer, the term of this patent is extended or adjusted under 35 U.S.C. 154(b) by 3 days.

(21) Appl. No.: 11/903,314

(22) Filed: Sep. 21, 2007

(65) Prior Publication Data

US 2008/0264664 A1 Oct. 30, 2008

Related U.S. Application Data

(60) Provisional application No. 60/927,075, filed on May 1, 2007, provisional application No. 60/926,574, filed on Apr. 27, 2007.

(51) Int. Cl.
*H02G 3/08* (2006.01)
(52) U.S. Cl. .................. 174/50; 174/480; 174/54; 174/58; 174/63; 174/64; 220/4.02; 439/535; 248/906; 361/642
(58) Field of Classification Search ............ 174/50, 174/481, 54, 58, 63, 64, 66, 67, 60, 135, 174/57; 220/4.02, 3.8, 3.2, 241, 242; 439/535, 439/135, 136, 142; 248/906, 343; 361/642, 361/600, 641
See application file for complete search history.

(56) References Cited

U.S. PATENT DOCUMENTS

| | | | |
|---|---|---|---|
| D314,748 S | 2/1991 | Littrell | |
| 5,117,996 A * | 6/1992 | McShane | .................... 220/3.7 |
| 5,306,870 A * | 4/1994 | Abat | ........................ 174/659 |
| 5,413,501 A * | 5/1995 | Munn | ......................... 439/535 |
| D378,674 S | 4/1997 | Volansky et al. | |
| 5,676,566 A | 10/1997 | Carlson, Jr. et al. | |
| 5,721,394 A | 2/1998 | Mulks | |
| 5,800,028 A * | 9/1998 | Smith et al. | .............. 312/223.1 |
| 5,807,139 A | 9/1998 | Volansky et al. | |
| 5,837,933 A * | 11/1998 | Fligelman | .................... 174/50 |
| D408,015 S | 4/1999 | Faucher | |
| 5,947,765 A | 9/1999 | Carlson, Jr. et al. | |
| D418,481 S | 1/2000 | Lin | |
| 6,086,414 A | 7/2000 | Tipton et al. | |
| 6,200,159 B1 | 3/2001 | Chou | |
| D451,479 S | 12/2001 | Bateson et al. | |

(Continued)

*Primary Examiner*—Dhiru R Patel
(74) *Attorney, Agent, or Firm*—Hoffmann & Baron, LLP

(57) ABSTRACT

An electrical box and cover that includes a body having a back wall, a face plate and a perimeter wall which define an interior and an exterior for the body. The back wall has one or more removable elements for forming apertures that can be used to mount connectors. The faceplate has an opening for accessing the interior that extends beyond the perimeter wall to expose a slot. The cover is connected to the body by one or more hinges and is pivotably movable between an open and closed position. When the cover is in the open position, it can be retracted into the housing. A housing extending from the rear of the face plate on the exterior of the body receives the cover. The cover can include a rail on the interior surface and the perimeter wall can include a track that receives the rail when the cover is retracted into the box.

17 Claims, 6 Drawing Sheets

U.S. PATENT DOCUMENTS

| | | |
|---|---|---|
| 6,350,151 B1 | 2/2002 | Elliot et al. |
| 6,444,906 B1 | 9/2002 | Lewis |
| 6,460,951 B1 | 10/2002 | Baxter et al. |
| 6,642,450 B1 | 11/2003 | Hsiao |
| 6,896,547 B2 | 5/2005 | Caveney |
| 7,075,004 B1 | 7/2006 | Gretz |
| 7,105,743 B2 | 9/2006 | Caveney |
| 7,381,890 B1 * | 6/2008 | Kinnard et al. ............... 174/50 |
| 7,427,713 B2 * | 9/2008 | Adducci et al. ............... 174/50 |

* cited by examiner

MULTI-MEDIA RECESS DATA LOW VOLTAGE BOX WITH SLIDE-AWAY HIDDEN COVER

This application claims priority from provisional application Ser. No. 60/926,574, filed on Apr. 27, 2007, and provisional application Ser. No. 60/927,075, filed on May 1, 2007, both of which are incorporated herein in their entirety.

FIELD OF THE INVENTION

The invention relates to a recessed, in-wall, electrical connector box for low voltage wiring that includes a flip-up cover. In particular, the invention relates to a recessed, in-wall, electrical connector box for low voltage wiring that includes a flip-up cover that can be retracted into the box.

BACKGROUND OF INVENTION

Electrical outlet boxes for housing electrical fixtures, such as switches and receptacles, are well known. Electrical outlet boxes typically have openings for inserting electrical wires into the box so that they can be terminated to the electrical fixtures inside. The fixtures are mounted inside the box in a manner that provides protection for the fixtures as well as the wire terminations. Such outlet boxes are generally mounted to a wall stud at a location that provides convenient access for the users. The outlet boxes can accommodate one or more electrical fixtures and the fixtures can operate using different voltages, such as 110 volts AC.

In some applications, electrical outlet boxes are also used to terminate communications wires for data, voice and signal transmission. These types of terminations typically involve low voltage signals which, in most cases, are not required under electrical and building codes to be housed in an electrical box. In contrast, electrical terminations for switches and receptacles operating at higher voltages must be housed in an electrical box. However, in order to protect low voltage connectors from damage and provide uninterrupted operation, it is desirable to locate the connectors in electrical boxes. Moreover, it has been found to be cost effective to use an electrical box that can accommodate more than one connector. Existing connector boxes do not accommodate multiple connectors and a separate box or support for each connector or termination must often be used.

It is also well known to provide a cover for electrical component boxes to protect the wires, cables and connectors housed within the electrical component box. These covers usually are attached to the electrical box with a combination of a hinge and a latching mechanism so that they can be easily opened and closed. However, when the cover is in the open position, it can restrict access to the interior of the box and make it more difficult for a user to install and service components housed inside the box. In addition, an open cover can cause safety issues for personnel or the cover can be damaged if inadvertently contacted by a person or an object.

Accordingly, there is a need for an electrical connector box with a cover that provides easy and convenient terminations for a plurality of different low voltage connectors. Moreover, there is a need for an electrical box cover that can be retracted into the box to provide unrestricted access to the interior of the box.

SUMMARY OF THE INVENTION

The present invention is an electrical box and cover having a body that includes a back wall, a face plate and a perimeter wall which define an interior and an exterior for the body. In preferred embodiments, the perimeter wall is formed by first and second side walls and first and second end walls. The back wall includes one or more removable elements for forming apertures that can be used to mount connectors in the back wall. The faceplate has an opening for accessing the interior and an inner perimeter edge around the opening. The opening in the face plate preferably extends beyond the perimeter wall or first side wall to expose a slot adjacent the perimeter wall or first side wall and the face plate. The slot has a pair of opposing ends that correspond to the opposing ends of the body.

A housing extends substantially parallel to perimeter wall or the first side wall and is preferably connected to the rear of the face plate. The housing can be configured as a single section or as two or more sections. In either configuration, the slot extends between the housing and the perimeter wall or the first side wall to the back of the body.

The cover includes an interior surface and an exterior surface and fits over the opening in the body. The cover is pivotably movable between an open position, which allows access to the interior, and a closed position, which prevents access to the interior. When the cover is in the open position, it can be slidably receivable by the housing. In preferred embodiments, the cover is substantially rectangular and has first and second side edges and first and second end edges which correspond to the sides and ends of the body. The cover is connected to the body by one or more hinges, such as a pivot hinge, for pivotally moving the cover between the open and closed positions. The pivot hinge can include a pin extending from each of the first and second end edges of the cover. The face plate can have a pair of notches for receiving the pins at the opposing ends of the slot. These notches are preferably formed on the rear surface of the face plate near the inner perimeter edge.

The cover can also include a rail extending from the interior surface and the perimeter wall or the first side wall can include a track. Preferably, the track extends from the slot at the front of the perimeter wall or side wall and is substantially perpendicular to the face plate. The track can be a slit in the perimeter wall or side wall having a width greater than the rail. When the cover is inserted through the slot and into the housing, the rail is slidably received by the track and maintains the alignment of the cover as it is retracted into the electrical box.

The body can include first and second ledges that extend into the interior of the body from the first and second end walls. A ledge can also extend into the interior from the second side wall. When the cover is in the closed position, the ledges are contacted by the cover and provide support for the cover. In a preferred embodiment, the back wall is connected to one of the end or side walls by one or more transition wall sections. The transition wall sections are disposed at an angle of between about 30 and 60 degrees from the back wall and can include one or more removable elements for forming apertures. The angle of the transition walls facilitates access to the connectors mounted in the apertures.

The apertures in the back wall can be used to mount a variety of different connectors having the same or different cut-out dimensions. Preferably, the dimensions of the apertures correspond to the cut-out dimensions of an f-type connector, an RCA type connector, a RJ-6 connector, a RJ-45 connector, a high-definition multimedia interface ("hdmi") connector, a digital visual interface ("dvi") connector or a fiber optics signal connector. However, the number of apertures and their dimensions are not intended to limit the invention.

BRIEF DESCRIPTION OF THE FIGURES

The preferred embodiments of the electrical box of the present invention, as well as other objects, features and advantages of this invention, will be apparent from the accompanying drawings wherein.

DETAILED DESCRIPTION OF THE INVENTION

Figure 1:
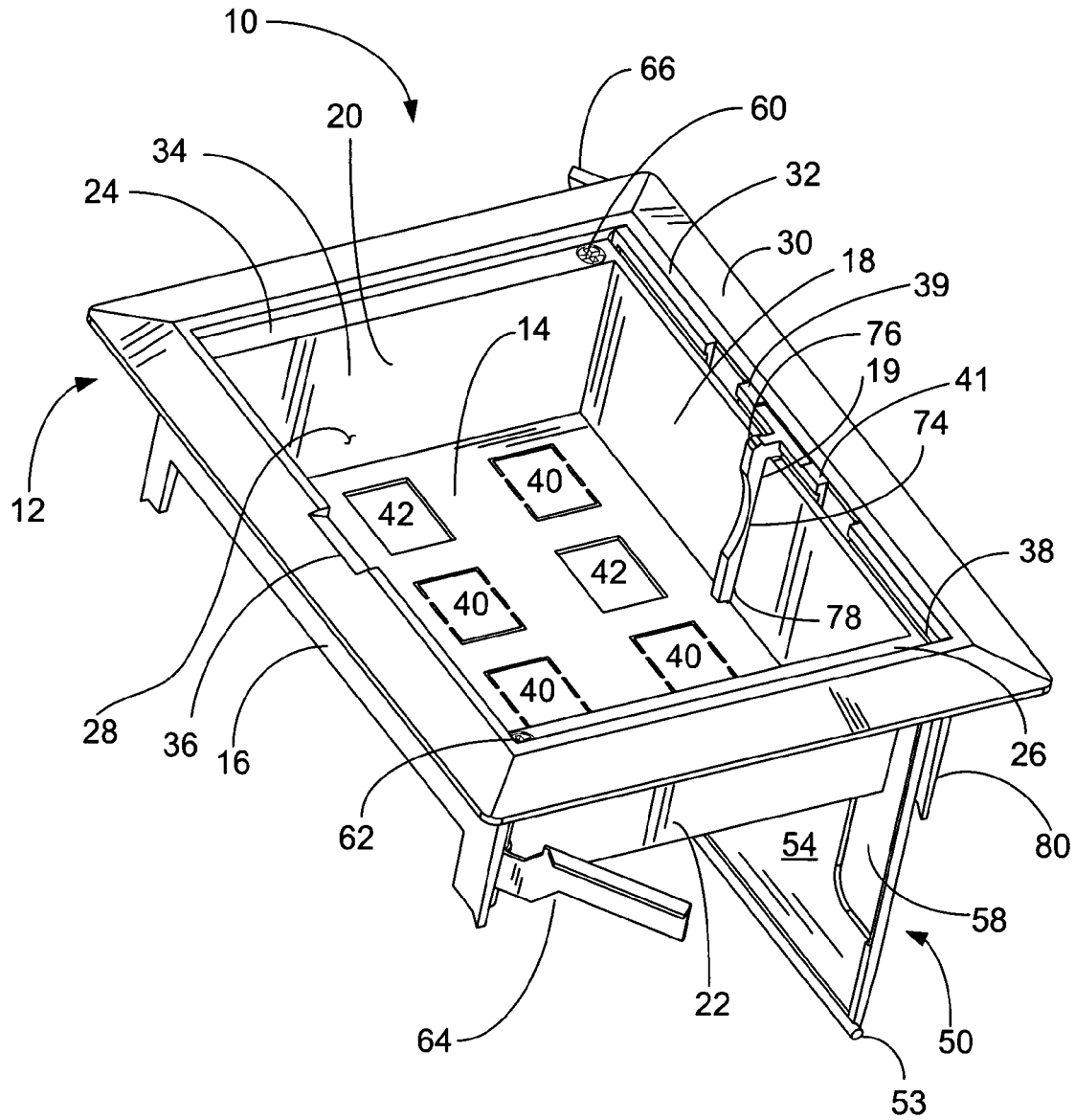
FIG. 1 is a front perspective view of a first embodiment of the electrical box with a hide-away cover retracted into the box.

The present invention provides an electrical box for housing a plurality of the same or different low voltage connectors. The electrical box is formed from sheet metal or a plastic material and includes a body having a back wall, a front face plate and a perimeter wall extending therebetween. The back wall includes one or more removable elements (also referred to as "knockouts") that form apertures for receiving one or more low voltage connectors. The face plate has an opening for accessing the interior of the box and the connectors that are mounted on the back wall. The perimeter wall typically has a rectangular shape and is formed by four wall sections, a pair of side walls and a pair of end walls. However, this is not a limitation and the invention includes electrical boxes having three perimeter wall sections and more than four perimeter wall sections, as well as a single perimeter wall section that has an oval or round shape. Preferably, the electrical box has a cover that can be opened and closed and fits over the opening in the face plate.

The electrical connector box can be adapted to receive connectors for one or more data lines by removing knockouts in the back wall to provide apertures for mounting the connectors. The connectors that mate with the connectors mounted in the back wall typically enter the box from the front through apertures in the face plate or cover. In addition, the box can have a "hide-away" or retractable cover that can be inserted into the box to provide unrestricted access to the interior. As used herein, the term "hide-away" or retractable cover refers to a cover that can be inserted into a slot located at the front of the box, preferably in the face plate, to expose the interior. One edge of the cover is accessible from the front and can be used to withdraw the cover from the slot. The cover opens and closes using a conventional hinge, preferably a pivot hinge, and once the cover is substantially perpendicular to the face plate, the cover slides into a housing attached to the rear of the face plate and/or the side of the box. The housing can include a groove or guiding track at the opposing ends to facilitate the movement of the cover into and out of the housing.

The back wall has one or more removable elements or "knockouts" that can easily be removed using a utility knife or screwdriver. The use of removable elements or knockouts in electrical outlet boxes is well known to those skilled in the art and they allow a user to form only as many apertures in the back wall as required by a particular application. This avoids the situation where an electrical box with pre-formed apertures is used and the installer does not use all of the apertures. The unused apertures then have to be closed using filler plates so that dirt and moisture cannot enter the box. The removable elements can have the same dimensions or different dimensions that correspond to the cut-out dimensions for a single type or a variety of different types of connectors. This allows a user to select an electrical box for connectors having the same cut-out dimensions or an electrical box for a variety of different connectors having different cut-out dimensions.

One or more of the removable elements or knockouts is removed to create an opening and a connector or binding post is inserted into the opening from the rear of the box. The cable connector is then secured to the back wall using well known techniques, such as a "snap-in" device provided with the connector or binding post. Preferably, the dimensions of the knockout openings correspond to the standard cut-out dimensions of the snap-in cable connectors and binding posts that are mounted in the back wall. The cable connectors mounted in the back wall are accessed through the front of the electrical box to make connections with mating connectors. Preferably, a female connector is mounted in the back wall and a male connector is inserted through the front of the electrical box and connected to the female connector. However, the configuration can be reversed and a male connector can be mounted in the back wall. In a typical application, the connectors in the electrical box are used for wires or cables that are installed in a wall for various data and media functions, for example cables for Ethernet, coaxial cable for video signals, speaker wires for audio signals or other low voltage or optical cables such as a high-definition multimedia interface ("hdmi"), a digital visual interface ("dvi"), or a TOSLINK® fiber optics signal connector.

The back wall of the body can be connected to the side walls and/or end walls by one or more transition wall sections. These transition wall sections extend upwardly from the back wall towards the front of the body at an angle of between about 15 and 75 degrees, preferably between about 30 and 60 degrees and most preferably about 45 degrees. The angle of the transition wall section or sections makes it easier for a user to access connectors that are mounted near the side or end walls. This provides an electrical box with an interior that does not have any hard to reach or cramped corners.

The face plate extends outwardly from and substantially perpendicular to the perimeter wall to form a flange around the opening in the front of the box. When the electrical box is installed in a wall or floor cut-out, the cut-out is large enough to allow the perimeter wall of the body to pass through but not the face plate, which contacts the surface of the wall around the cut-out. In new constructions, the electrical box can be attached to a stud using screws, nails or other types of fasteners. When the box is installed in an existing wall structure, a cut-out is made in the wall and rotatable mounting brackets can be used to secure the box in place.

The shape of the cover corresponds to the shape of the opening in the face plate. In one embodiment, the cover has a rectangular shape with four edges extending around the sides of the cover. The locations of these four edges correspond to the two side walls and two end walls of the body. When the cover is in the closed position, it contacts two ledges at the front of the body that extend between the end walls and the face plate. In some embodiments, a third ledge extends into the interior between the face plate and the second side wall.

The ledges are recessed from the surface of the face plate so that, when the cover is in the closed position, the top surface of the cover is substantially flush with the top surface of the face plate. The cover has a hinge located on or near one of the edges which pivotally rotates the cover between the open and closed positions. When the cover is in the closed position, a variety of different mechanisms can be used to secure the cover to the body, including latches, snaps, fasteners and tabs. Preferably, these mechanisms are located on the side of the opening opposite the pivoting edge of the cover. The cover can also have one or more knockouts which can be removed to create apertures that are used as access ports for cables and wires passing into the box for termination with the connectors therein.

In a preferred embodiment, a pivot hinge is formed on one side of the cover so that the cover is pivotally moveable between an open and closed position. The pivot hinge includes two pins that extend from opposing edges of the cover and engage mounting apertures in the face plate. The two mounting apertures are located at the opposing ends of the slot that is formed between the exterior of one of the side walls and the faceplate. When the cover is in the open position and substantially perpendicular to the face plate, it can be inserted into the slot until the side of the cover opposite the pivot hinge is approximately flush with the face plate. In this position, the cover is mostly hidden from view and allows unrestricted access to the interior of the body.

A housing for receiving the cover is attached to the face plate and/or the side wall and is aligned with the slot in the face plate. The housing includes an outer wall having a pair of opposing sides and front and rear ends, which correspond with the front and rear of the box. The outer wall is substantially parallel to the side wall of the body and, together with the side wall, provides a protected space for the cover when it is inserted into the electrical box. The front end of the housing corresponds with the slot in the face plate and it receives the cover when the cover passes through the slot. When the cover is in the fully retracted position, it passes through the rear end of the housing in this embodiment.

The sides of the housing can have a pair of opposing side walls that extend towards the side wall of the body. The opposing side walls keep the cover aligned when it is retracted into the box. Each side wall can include a groove or a track for receiving the opposing sides of the cover and guiding the cover as it is retracted. In some embodiments, the outer wall can be formed by more than one section. When formed as a single section, the outer wall extends continuously between the opposing sides of the housing. When formed from more than one section, the outer wall has two or more separate sections.

The interior surface of the cover can include a rail that extends perpendicularly to and at least partially between the two opposing sides. The rail is substantially perpendicular to the axis on which the cover pivots and is located on the cover so that it corresponds to a track in the side wall of the body. The track in the side wall is in communication with the slot in the face plate and extends from the front of the body towards the back wall. The track slidably receives the rail when the cover is inserted into the housing. The dimensions of the track can vary depending on the size of the rail but, preferably, must be great enough so that the cover is below the surface of the face plate when the cover is inserted into the box. The rail can include a member that extends from the sides and engages the body when the cover is completely inserted into the box (i.e., when the cover is in the fully retracted position). This prevents the cover from being disconnected from the box when it is in the fully retracted position. In order to remove the cover from the box and close it over the opening in the face plate, the cover must be fully withdrawn from the housing and then rotated about the hinge axis into a closed position.

At least one rotatable mounting bracket that includes a tapped cylindrical base and an arm extending outwardly and perpendicularly from the longitudinal axis of the cylindrical base is positioned at each of the end walls of the box near the corner formed with the adjoining side wall. The mounting brackets can be attached to the end walls so that the cylindrical base can be freely rotated. Mounting screws are inserted into the tapped cylindrical base through apertures in the front of the box to retain the mounting bracket in place. After the box is inserted into a cut-out in an existing wall, the mounting screws are turned clockwise and rotate the cylindrical base so that the arms pivot away from the end walls. The side walls or a member attached to the perimeter wall of the body can extend above the end walls to prevent the arms from rotating more than about 90 degrees from the surface of the end wall. When an arm contacts a side wall or member, it stops rotating and the continued turning of the screw begins to move the arm toward the face plate at the front of the box until the arm engages the wall. The mounting screw continues to be turned until the wall is wedged between the arm and the back side of face plate, thereby securing the electrical box in place.

Referring to the drawings, FIG. 1 shows a first embodiment of the electrical box 10 that includes a body 12 and a cover 50. The body 12 is generally rectangular in shape and has a back wall 14 and a face plate 30 connected by a perimeter wall, which is formed by a pair of side walls 16, 18 and a pair of end walls 20, 22. Each of the end walls 20, 22 has a ledge 24, 26 that connects the top of each end wall 20, 22 to the face plate 30. The face plate 30 has an opening 34 for accessing the interior 28 of the box 10 and a recessed edge 32 that extends around the perimeter of the opening 34. The cover 50 is shown inserted in a slot 38 adjacent one of the side walls 18 and the recessed edge 32 of the face plate 30, referred to herein as the "fully retracted position." The face plate 30 extends outwardly from the top of the perimeter wall at a substantially right angle to the side walls 16, 18 and end walls 20, 22 and is used to mount the electrical box 10 in a ceiling, wall or floor. The shape of the cover 50 generally conforms to the rectangular shape of the opening 34 in the face plate 30.

When the cover 50 is in the fully retracted position, it is disposed between the side wall 18 and a housing 80 that extends from the rear of the face plate 30 and is substantially parallel to the side wall 18. The housing 80 keeps the cover 50 aligned as it is inserted into the slot 38 and protects it so that objects inside a wall, such as electrical wiring, don't interfere with the movement of the cover 50. The housing 80 can be a continuous wall (or a plurality of wall sections) that extends partially or entirely along the length of the slot 38. Preferably, the housing 80 extends downwardly from the face plate 30 to the bottom of the side wall 18, but the dimensions of the housing 80 can vary. Preferably, the housing 80 extends beyond the wall (not shown) in which the box 10 is mounted so that the wall does not interfere with the movement of the cover 50.

The inside surface 54 of the cover 50 has a rail 74 that extends perpendicularly between the sides of the cover 50, i.e., from the edge of the cover 50 next to the slot 38 to the opposing edge. The location of the rail 74 corresponds to a track 19 in the side wall 18. When the cover 50 is inserted into the slot 38, the rail 74 moves down the track 19 and keeps the cover 50 aligned. A tab 76 extends from one end of the rail 74 and it is used to engage a slot 36 in the face plate 30 when the cover 50 is in the closed position (see FIG. 4). A pair of members 39, 41 (see FIG. 2) on the perimeter of the cover 50 also secure the cover 50. In the closed position, the cover 50 contacts the ledges 24, 26 so that the front surface 52 of the cover 50 lies substantially on top of the recessed edge 32 of the face plate 30. The tab 76 can also be used to grip the rail 74 and withdraw the cover 50 from the slot 38.

The rail 74 also includes a stop 78 which prevents the rail 74 from moving along the track 19 after the cover 50 has reached the fully retracted position. This prevents the cover 50 from passing completely through the slot 38 and housing 80 and disconnecting from the body 12. Preferably, the distance between the stop 78 and the tab 76 is about equal to the height of the side wall 18. In the fully retracted position, the edge of the cover 50 is approximately flush with the recessed edge 32 or the face plate 30.

Retracting the cover 50 reveals the interior 28 of the box 10 including the back wall 14, which has a plurality of removable elements 40. These elements 40 can be removed to form apertures 42 for mounting low voltage connectors (not shown). FIG. 1 also shows a pair of rotatable mounting brackets 64, 66 located next to the end walls 20, 22 at diagonally opposing corners of the body 12. The mounting brackets 64, 66 are used when the electrical box 10 is mounted in an existing wall and the installer is unable to attach the box 10 to a wall stud. The mounting brackets 64, 66 swing outwardly from the end walls 20, 22 after the box 10 is passed through a wall cut-out by rotating mounting screws 60, 62.

Figure 2:
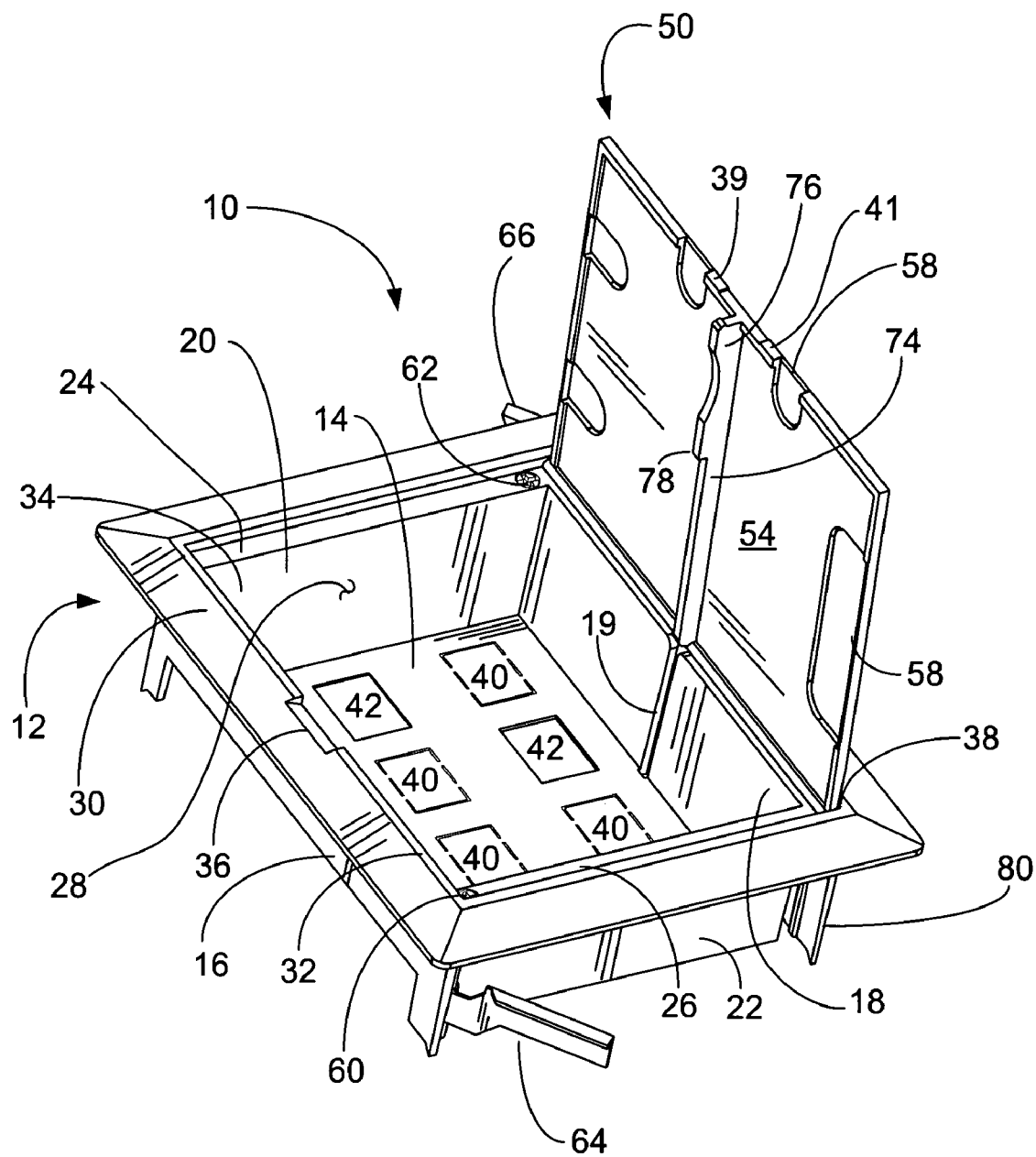
FIG. 2 is a front perspective view of the first embodiment of the electrical box with the cover in the fully open position.

FIG. 2 shows an embodiment of the electrical box 10 with the cover 50 in a fully open and upright position. In the fully open position, the cover 50 is parallel to the side wall 18 and can be either rotated to close the opening 34 in the face plate 30 or inserted into the slot 38 in the face plate 30. The cover 50 can also have one or more knockouts 58 which can be removed to allow cables and or wires (not shown) to pass through the cover 50 into the interior 28 of the body 12. The stop 78 that extends outwardly from the rail 74 limits how far the cover 50 can be inserted into the slot 38. When the cover 50 is closed, two members 39, 41 on the perimeter of the cover 50 engage the edge 32 of the face plate 30 on either side of the slot 36 to secure the cover 50 in the closed position. The edge 32 of the face plate 30 can have two recesses (not shown) for receiving the members 39, 41.

Figure 3:
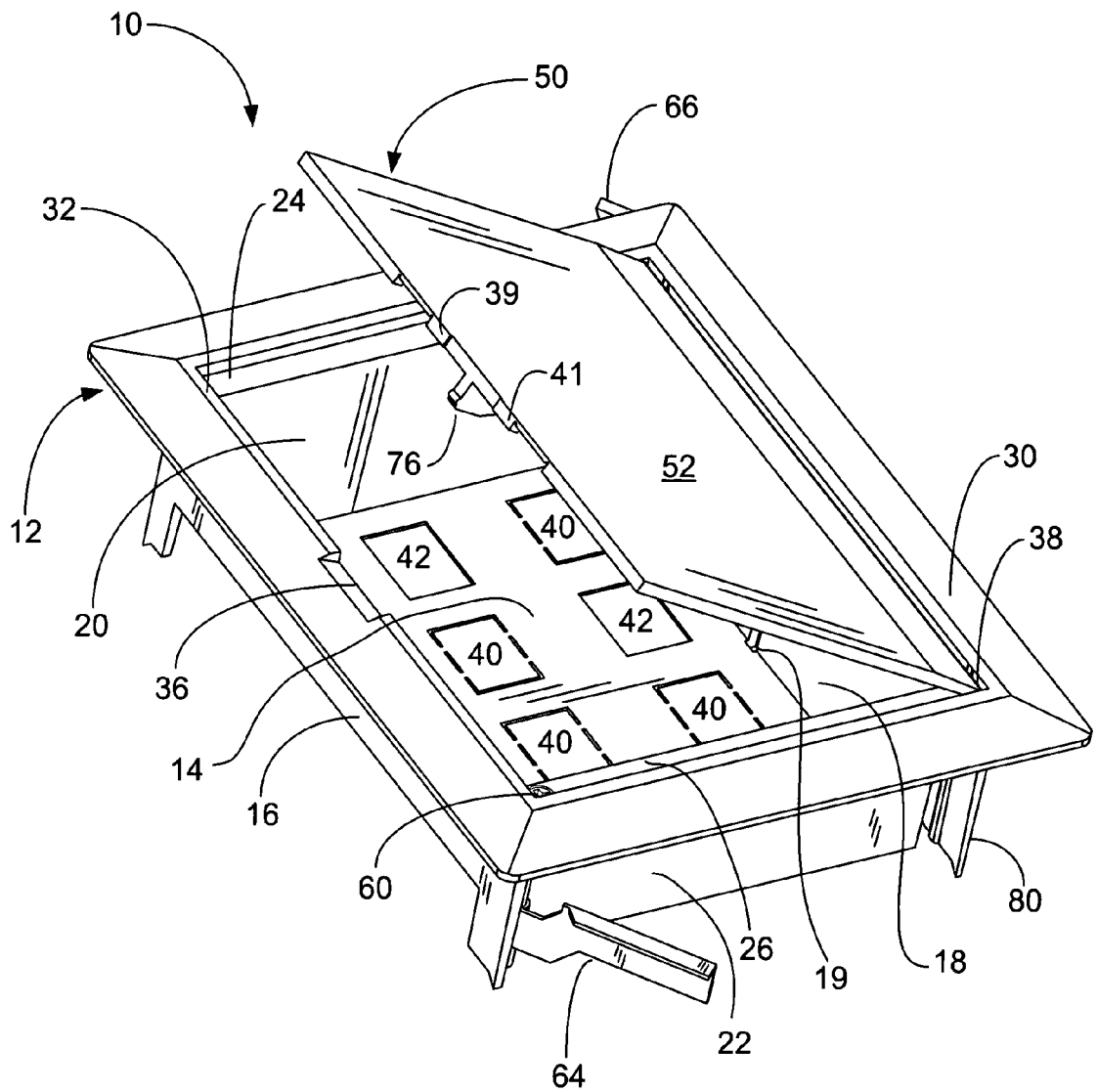
FIG. 3 is a front perspective view of the first embodiment of the electrical box with the cover partially open.

FIG. 3 shows an embodiment of the electrical box 10 with the cover 50 pivoting along one end and into a partially closed position. This figure illustrates how the cover 50 contacts the ledges 24, 26 on the end walls 20, 22 as it closes. When the cover 50 is in the fully closed position (see FIG. 4), it is supported by the ledges 24, 26 and the tab 76 engages the slot 36 to secure the cover 50 to the body 12. In addition, the exterior surface 52 of the cover 50 is substantially flush with the face plate 30.

Figure 5:
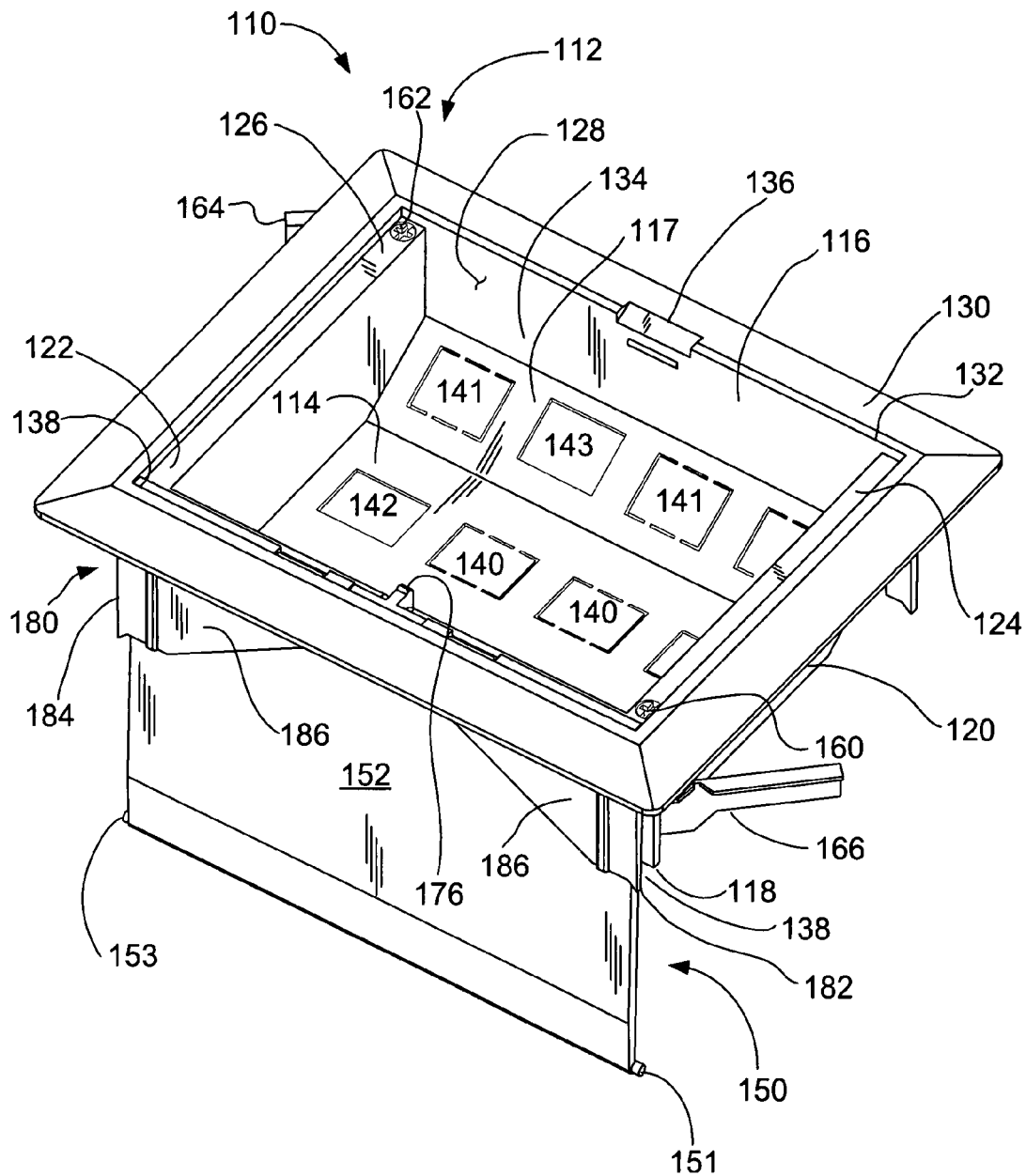
FIG. 5 is a front perspective view of a second embodiment of the electrical box with a hide-away cover fully retracted to reveal the interior of the box.

The cover 50 pivotally moves between the open and closed positions using a pivot hinge formed by pair of pins 53 (see FIG. 1 (only one is shown) and FIG. 5) on opposing edges of the cover 50. The pins 53 engage a pair of notches (not shown) in the face plate 30, which extend approximately half the distance between the rear and front surface of the face plate 30. When the cover 50 is withdrawn from the slot 38, the pins 53 move into the pair of notches until the cover 50 is above the ledges 24, 26. The cover 50 can then be pivotally rotated into a closed position.

Figure 4:
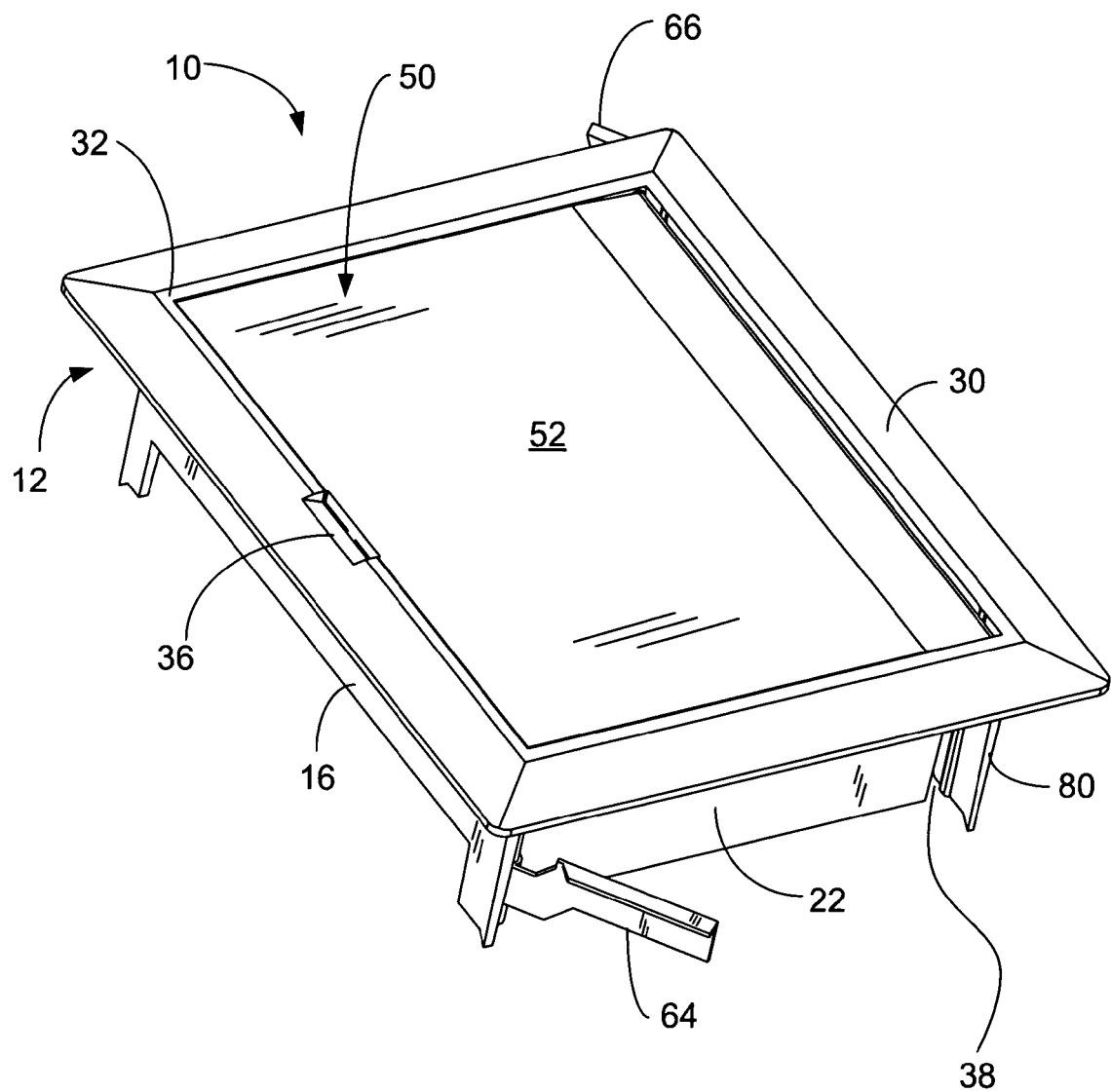
FIG. 4 is a front perspective view of the first embodiment of the electrical box with the cover in the fully closed position.

FIG. 4 shows an embodiment of the electrical box 10 with the cover 50 in the fully closed position. A pair of recesses (not shown) on either side of the slot 36 (or alternatively, no recesses at all) accept or engage members 39, 41 located on either side of the tab 76 on cover 50. This arrangement allows the cover 50 to be snapped closed and secured in a closed position by members 39, 41 and tab 76. Applying a force against the tab 76 (e.g., by inserting a flat-bladed screwdriver in the slot 36 and twisting) releases the members 39, 41 and the tab 76 (see FIG. 3) and allows the user to open the cover 50. The figure shows the housing 80 extends laterally beyond end wall 22 so that the ends of the cover 50 are protected when the cover 50 is inserted into the housing 80 (see FIG. 1).

FIG. 5 shows a second embodiment of the electrical box 110 with the cover 150 in the fully retracted position. Similar to the first embodiment, the body 112 is generally rectangular in shape and has a face plate 130 connected by a perimeter wall, which is formed by a pair of side walls 116, 118 and a pair of end walls 120, 122. Each of the end walls 120, 122 has a ledge 124, 126 that connects the top of each end wall 120, 122 to the face plate 130. The face plate 130 has an opening 134 for accessing the interior 128 of the box 110 and a recessed edge 132 that extends around the perimeter of the opening 134. The cover 150 is inserted in a slot 138 adjacent one of the side walls 118 and the recessed edge 132 of the face plate 130. The face plate 130 extends outwardly from the top of the perimeter wall at a substantially right angle to the side walls 116, 118 and end walls 120, 122 and is used to mount the electrical box 110 in a ceiling, wall or floor. The shape of the cover 150 generally conforms to the rectangular shape of the opening 134 in the face plate 130.

Unlike the first embodiment shown in FIG. 1, the second embodiment of the electrical box 110 shown in FIG. 5 includes a back wall 114 that is substantially parallel to the face plate 130 and an offset or angled transition wall 117 that extends between the back wall 114 and one of the side walls 116. Both the back wall 114 and transition wall 117 have removable elements 140, 141 that can be removed to provide apertures 142, 143 for mounting connectors (not shown). The transition wall 117 makes it easier for a user to access the connectors mounted in the apertures 143 in the corners of the interior 128 of the box 110. While FIG. 5 shows one transition wall 117, the body 112 can have additional transition walls (not shown) to facilitate access to the connectors mounted in these walls. These additional walls can be located between the back wall 114 and the other side wall 118 or between the back wall 114 and one or both of the end walls 120, 122.

FIG. 5 also shows an embodiment in which the housing 180 includes two wall sections 186 that extend downwardly from the rear of the face plate 130 and has opposing ends 182, 184. The housing 180 and the side wall 118 form a slot 138 which slidably receives the cover 150 when it is retracted into the electrical box 110. The cover 150 has a pair of pins 151, 153 on opposing edges which are part of a pivot hinge assembly. When the cover 150 is moved into a fully open position (see FIG. 2), the pins 151, 153 engage notches (not shown) in the rear of the face plate 130. As the cover 150 is closed, the pins 151, 153 pivot in the notches (see FIG. 3).

Figure 6:
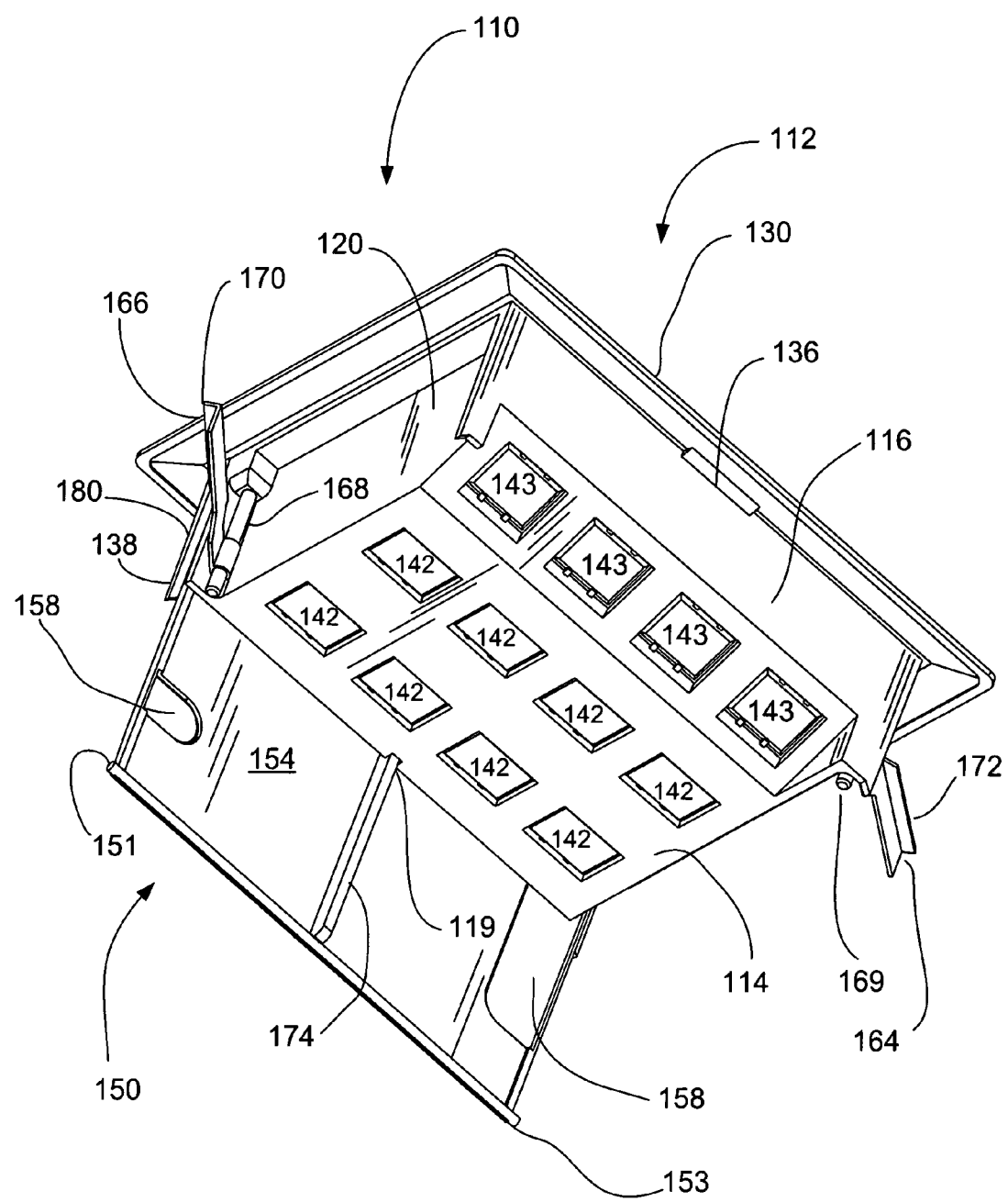
FIG. 6 is a rear perspective view of the second embodiment of the electrical box with the cover in the retracted position.

FIG. 6 is a rear view of the second embodiment of the electrical box 110 and it shows the rail 174 on the inside surface 154 of the cover 150 as it passes through the track 119 in the side wall 118 (FIG. 5). The rail 174 guides the cover 150 so that it stays aligned as it is retracted into the electrical box 110. The interior surface 154 of the cover 150 can have one or more knockouts 158 that are removed to provide openings for wires and/or cables (not shown) to enter and leave the body 112. In addition, all of the removable elements 140, 141 (see FIG. 5) are removed to provide apertures 142, 143 in the back wall 114 and transition wall 117, respectively.

FIG. 6 also illustrates the operation of the rotatable mounting brackets 164, 166 which are shown in a partially extended position. Each of the rotatable mounting brackets 164, 166 includes a tapped cylindrical base 168, 169 that receives a mounting screw 160, 162 (FIG. 5) and an arm 170, 172 extending outwardly from the cylindrical base 168. The mounting screws 160, 162 are inserted through an opening in the ledge 124, 126 (FIG. 5) at the front of the box 110 and engage the tapped cylindrical bases 168, 169. Before the body 112 is installed in a wall, the mounting screws 160, 162 (FIG. 5) are rotated counterclockwise to position the mounting brackets 164, 166 parallel to the end walls 120, 122. After the body 112 is inserted through the cut-out in the wall (not shown), the mounting screws 160, 162 are rotated in the clockwise direction to pivot the arms 170, 172 of the mounting brackets 164, 166 upwardly and away from the surfaces of the end walls 120, 122 into an upright position. After the arms 170, 172 are rotated into an extended position, further rotation of the mounting screws 160, 162 moves the arms 170, 172 toward the wall (not shown) and the face plate 130 on the opposing side of the wall. Once the mounting screws 160, 162 are fully tightened, the body 112 is secured to the wall.

Thus, while there have been described the preferred embodiments of the present invention, those skilled in the art will realize that other embodiments can be made without departing from the spirit of the invention, and it is intended to include all such further modifications and changes as come within the true scope of the claims set forth herein.

We claim:

1. An electrical box and cover comprising:
a body comprising a back wall, a face plate, first and second side walls and first and second end walls which define an interior and an exterior, wherein the back wall comprises one or more removable elements for forming apertures, wherein the faceplate has an opening for accessing the interior, and wherein the opening extends beyond the first side wall to expose a slot adjacent the first side wall and the face plate; a housing comprising a continuous wall or a plurality of wall sections and extending substantially parallel to the first side wall; wherein the housing is connected to the face plate; and a cover comprising an interior surface and an exterior surface, wherein the cover fits over the opening and is pivotably movable between an open position, which allows access to the interior, and a closed position, which prevents access to the interior, and wherein the cover is slidably receivable by the slot when in the open position and wherein the slot is formed by the housing wall and the first side wall.

2. An electrical box and cover according to claim 1, wherein the cover is substantially rectangular and has first and second side edges and first and second end edges which correspond to the side walls and end walls of the body.

3. An electrical box and cover according to claim 2, wherein the cover is connected to the body by one or more hinges.

4. An electrical box and cover according to claim 3, wherein the hinge is a pivot hinge.

5. An electrical box and cover according to claim 4, wherein the pivot hinge comprises a pin extending from each of the first and second end edges.

6. An electrical box and cover according to claim 5, wherein the slot has a pair of opposing ends and wherein the face plate has a pair of notches for receiving the pins at the opposing ends of the slot.

7. An electrical box and cover according to claim 1, wherein the cover further comprises a rail extending from the interior surface, wherein the first side wall comprises a track that extends from the slot and is substantially perpendicular to the face plate, and wherein the rail is slidably received by the track when the cover is inserted into the slot.

8. An electrical box and cover according to claim 1, wherein the housing comprises two or more sections.

9. An electrical box and cover according to claim 1, wherein first and second ledges extend from the first and second end walls and wherein the first and second ledges are contacted by the cover when the cover is in the closed position.

10. An electrical box and cover according to claim 1, wherein the back wall is connected to one of the end walls or side walls by a transition wall section that comprises one or more removable elements for forming apertures.

11. An electrical box and cover according to claim 10, wherein the transition wall section is disposed at an angle of between about 30 and 60 degrees from the back wall.

12. An electrical box and cover comprising: a body comprising a back wall, a face plate and a perimeter wall which define an interior and an exterior, wherein the back wall comprises one or more removable elements for forming apertures, wherein the faceplate has an opening for accessing the interior, and wherein the opening extends beyond the perimeter wall to expose a slot formed by the perimeter wall and the face plate; a housing comprising a continuous wall or a plurality of wall sections and extending substantially parallel to the slot and next to the perimeter wall; and a cover comprising an interior surface and a hinge that connects the cover to the body, wherein the cover fits over the opening and is pivotably movable between an open position, which allows access to the interior, and a closed position, which prevents access to the interior, and wherein the cover is slidably receivable by the slot when in the open position and wherein the housing is connected to the face plate.

13. An electrical box and cover according to claim 12, wherein the cover is connected to the body by a pivot hinge that comprises a pair of pins.

14. An electrical box and cover according to claim 13, wherein the slot has a pair of opposing ends and wherein the face plate has a pair of notches for receiving the pins at the opposing ends of the slot.

15. An electrical box and cover according to claim 12, wherein the cover further comprises a rail extending from the interior surface, wherein the perimeter wall comprises a track that extends from the slot and is substantially perpendicular to the face plate, and wherein the rail is slidably received by the track when the cover is inserted into the slot.

16. An electrical box and cover according to claim 12, wherein the back wall is connected to the perimeter wall by a transition wall section disposed at an angle of between about 30 and 60 degrees from the back wall, wherein the transition wall section comprises one or more removable elements for forming apertures.

17. An electrical box and cover comprising: a body comprising a back wall, a face plate and a perimeter wall which define an interior and an exterior, wherein the back wall comprises one or more removable elements for forming apertures, wherein the faceplate has an opening for accessing the interior, wherein the opening extends beyond the perimeter wall to expose a slot formed by the perimeter wall and the face plate, and wherein the perimeter wall comprises a track that extends from the slot and is substantially perpendicular to the face plate; a housing connected to the face plate extending substantially parallel to the slot; wherein the housing comprises a continuous wall or a plurality of wall sections and wherein the slot is formed by the housing wall and the perimeter wall; and a cover comprising an interior surface and a rail extending from the interior surface, wherein the cover fits over the opening and is pivotably movable between an open position, which allows access to the interior, and a closed position, which prevents access to the interior, wherein the cover is slidably receivable by the slot when in the open position, and wherein the rail is slidably received by the track when the cover is inserted into the slot.

* * * * *